United States Patent Office 2,814,645
Patented Nov. 26, 1957

2,814,645

AROMATIC PHOSPHONIC DICHLORIDES

Ruth A. Greenwood and Mario Scalera, Somerville, and Hans Z. Lecher, Plainfield, N. J., assignors to American Cyanamid Company, New York, N. Y., a corporation of Maine No Drawing. Application May 25, 1953,
Serial No. 357,368

16 Claims. (Cl. 260—543)

This invention relates to a process for preparing aromatic phosphonic acid dichlorides.

In the copending application of Lecher, Chao and Whitehouse, Serial No. 345,264, filed March 27, 1953, U. S. Patent No. 2,717,906, dated September 13, 1955, there is described and claimed a new process of phosphonating carbocyclic aromatic compounds which are free from polar groups capable of reacting with phosphoric anhydride. In the process hexagonal phosphoric anhydride reacts with the aromatic compound, preferably in excess, at a temperature between 250° and 325° C. Phosphonic acids are not produced directly but instead there are obtained primary reaction products of phosphoric anhydride with the aromatic compound. One type of primary reaction product is obtained in the form of a brittle solid or viscous liquid and is not soluble in the aromatic compound. It results from the union of one molecule of the aromatic starting material and one molecule of $P_4O_{10}$. Although it is not desired to limit either the present application or the copending application referred to above to any theory of reaction, there is good evidence that the first type of primary reaction product has the following formula:

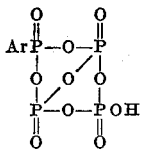

in which Ar stands for the carbocyclic aromatic radical. In the case of the reaction of benzene with phosphoric anhydride, this is the sole primary reaction product produced.

In the case of aromatic compounds other than benzene such as, for example, chlorobenzene, xylene or polycyclic compounds such as naphthalene, there is also formed another primary reaction product which is soluble in the excess of the aromatic compound. Again while it is not desired to limit the invention to any particular theory, there is good evidence which indicates that this second type of primary reaction product is a polymer of the phosphonic anhydride $ArPO_2$ in which Ar is the carbocyclic aromatic radical in question.

When it is desired to prepare aromatic phosphonic acids from the two types of primary reaction products referred to above, it is possible to effect this by hydrolysis. However, the procedure presents some disadvantages because it is necessary to recover the phosphonic acids by concentrating the aqueous hydrolysis solution and crystallization. Unfortunately, some of the phosphonic acids show considerable solubility in water which results in a loss in the mother liquor when they are washed in order to remove orthophosphoric acid which is formed in the hydrolysis reaction. This loss is particularly serious in the case of phenylphosphonic acid which is quite soluble in water.

According to the present invention, we have found that the primary reaction products referred to above can be converted into a mixture of the corresponding phosphonic acid dichlorides and phosphorus oxychloride which are easy to separate. This method permits a higher recovery of organophosphorus compounds and can also be used as an effective means for the production of pure aromatic phosphonic acids. The carbocyclic aromatic phosphonic dihalides are also useful as starting materials for the preparation of plastics, drugs, pesticides and dye intermediates.

The process of the present invention uses phosphorus pentachloride as a chlorinating agent, the process proceeding in accordance with the following equations for the two primary reaction products, the second product being shown in its monomeric form:

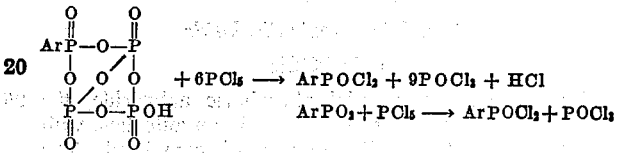

where Ar stands for the carbocyclic aryl group.

The reaction may be performed without any solvent or in an inert solvent. We find it preferable to use as an inert solvent phosphorus oxychloride as it presents no recovery problem since the same compound is produced in any event in the reaction. In the case of the phenylphosphonic derivatives which exists only in the first form of primary reaction product, it may be removed from the unreacted excess of benzene by decantating the latter and then subjected to chlorination with phosphorus pentachloride. In the case of the other carbocyclic aromatic phosphonic derivatives where both types of primary reaction products are produced, it is not necessary to separate them. It is sufficient to evaporate the solution if desired, and to chlorinate the two primary reaction products together since they produce the same final products.

While it is possible to produce aromatic phosphonic acid dichlorides by chlorinating the corresponding phosphonic acids, this involves many more steps, and because of its higher cost is not of practical interest as compared with the cheap and simple process of the present invention in which the phosphonic acid dichlorides are produced directly in a single step.

In the process of the present invention it is desirable to use a slight excess of phosphorus pentachloride. The particular excess to be used is in no way critical but since phosphorus pentachloride is capable of subliming it is desirable to remove any unreacted excess which can be effected simply after the reaction is complete by passing in sulfur dioxide which converts the phosphorus pentachloride into phosphorus oxychloride and thionyl chloride, both of which are readily removable by distillation as will be described below. Inasmuch as it is desirable to remove unreacted phosphorus pentachloride, more than a slight excess should not be used as it is more or less wasted and constitutes an economic loss. The reaction, however, is not critical with respect to the particular amount of excess of phosphorus pentachloride used.

The reaction mixture from the chlorination of phosphorus pentachloride is subjected to distillation, if necessary, after first transforming excess phosphorus pentachloride into thionyl chloride. The small amount of thionyl chloride produced is first removed and the next fraction is phosphorus oxychloride. When the phosphorus oxychloride is removed, the aromatic phosphonic dichlorides may be distilled out under ordinary pressure or in the case of higher boiling compounds under reduced pressure. The phosphorus pentachloride used, may be readily formed or produced in situ in the reaction from phosphorus trichloride and chlorine.

The process of the present invention is applicable to the primary reaction products of carbocyclic aromtic compounds free from polar groups capable of reacting with hexagonal phosphoric anhydride. Among typical primary reaction products are those of hexagonal phosphoric anhydride with benzene and its homologs such as toluene, ethylbenzene, xylenes, etc. diphenyl, diphenyl methane, naphthalene, tetralene, phenanthrene, anthracene, fluoranthene, acenaphthene, perylene, pyrene, chrysene and similar hydrocarbons. Also included are the primary reaction products from halogen derivatives of carbocyclic aromatic hydrocarbons such as fluorobenzene, chlorobenzene, di- and tri-chlorobenzenes, bromobenzene and the like.

The invention will be described in greater detail in conjunction with the following specific examples in which the parts are by weight.

EXAMPLE 1

*Phenylphosphonic dichloride*

$C_6H_5POCl_2$

Benzene and commercial phosphoric anhydride, the former in a large excess, are heated in an autoclave with agitation at 275° C. until the reaction is completed. The unreacted benzene is then decanted off and 26 parts of the remaining primary reaction product are mixed with 89.6 parts of phosphorus pentachloride and heated under reflux in 167.5 parts of phosphorus oxychloride until the evolution of hydrogen chloride ceases. Sulfur dioxide is then bubbled through in sufficient amount to destroy the excess phosphorus pentachloride. The reaction mixture is then subjected to distillation, the thionyl chloride first coming off followed by the phosphorus oxychloride. Finally the phenylphosphonic dichloride is distilled off under reduced pressure. It has a boiling point of 137 to 138° C. at 15 mm.

EXAMPLE 2

*2-naphthylphosphonic dichloride*

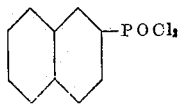

512 parts by weight of naphthalene and 56.8 parts by weight of commercial phosphoric anhydride (ratio $20C_{10}H_8:1P_4O_{10}$) are heated in an autoclave with agitation at 275° C. until the reaction is complete. When the reaction is finished the naphthalene is removed by distillation and the residue is treated with 250 parts by weight of phosphorus pentachloride and 150 parts by weight of phosphorus oxychloride as a diluent. The reaction mixture is heated to reflux (about 110° C.) until the reaction is complete and the evolution of hydrogen chloride has ceased. Sulfur dioxide is passed in to destroy any excess of phosphorus pentachloride. Then the thionyl chloride and the phosphorus oxychloride are distilled off and the residue is distilled under reduced pressure. The 2-naphthylphosphonic dichloride distills at 173° C. (3 mm.). It has a melting point of approximately 46° C.

EXAMPLE 3

*(1,2-dimethylphenyl)-phosphonic dichloride*

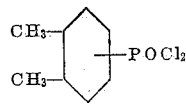

264.3 parts by weight of o-xylene and 71 parts of commercial phosphoric anhydride (ratio $10C_8H_{10}:1P_4O_{10}$) are heated in an autoclave with agitation at 275° C. until the reaction is complete. After cooling, the autoclave content consists of a black pitch and a xylene solution. Without separation the unreacted o-xylene is distilled off. The still residue is treated with 167 parts by weight of phosphorus oxychloride and 322 parts of phosphorus pentachloride. This mixture is heated with stirring to reflux until the evolution of hydrogen chloride ceases. Then sulfur dioxide is passed in to destroy the excess phosphorus pentachloride. The thionyl chloride and the phosphorus oxychloride formed are distilled off and then the phosphonic dichloride is distilled under reduced pressure; B. P. 135 to 143° C. (3.5 mm.).

The production of the phosphonic dichloride of o-xylene results normally in a minor amount of chlorination of the methyl groups. In the formula given above, this minor amount of side chain chlorination is not shown and it should be understood that in the specification and claims when reference is made to the phosphonic dichloride derivative of o-xylene this includes compounds in which there is a minor amount of side chain chlorination.

EXAMPLE 4

*Chlorophenylphosphonic dichlorides*

338 parts by weight of chlorobenzene and 42.7 parts by weight of commercial phosphoric anyhdride (ratio $20C_6H_5Cl:1P_4O_{10}$) were heated in an autoclave with agitation at 310° C. until the reaction was complete. After cooling, the content of the autoclave consisted of a black pitch (containing the first type of primary reaction product and some metaphosphoric acid) and a chlorobenzene solution (containing the second type of primary reaction product).

In order to show that both types of reaction products are converted into the phosphonic dichlorides, they were chlorinated separately. The chlorobenzene solution was decanted from the pitch and evaporated under reduced pressure. The sirupy still residue (the analysis showed the ratio of $1C_6H_4Cl:1P$) was diluted with 168 parts by weight of phosphorus oxychloride and 130 parts of phosphorus pentachloride was added. This mixture was heated to reflux until the reaction was complete. Then sulfur dioxide was passed into the solution for one hour. The thionyl chloride and phosphorus oxychloride formed were distilled off and subsequently the phosphonic dichlorides were distilled under reduced pressure; B. P. 118 to 120° C. (3 mm.).

The comminuted pitch was also slurried with phosphorus oxychloride and 110 parts by weight of phosphorus pentachloride was added. The mixture was refluxed until reaction was substantially complete and then sulfur dioxide was passed through until the excess phosphorus pentachloride was destroyed. The thionyl chloride and phosphorus oxychloride formed were distilled off and subsequently the phosphonic dichlorides were distilled under reduced pressure; B. P. 132 to 133° C. (10–11 mm.).

The chlorophenylphosphonic dichlorides obtained consisted of a mixture of predominantly para with some ortho compound. Hydrolysis gave a mixture of p- and o-chlorophenylphosphonic acids and on recrystallization pure p-chlorophenylphosphonic acid was obtained.

We claim:

1. A process for preparing aromatic phosphonic dichlorides of the formula $ArPOCl_2$ where Ar is a carbocyclic aromatic radical which consists in heating with phosphorus pentachloride reaction products produced by reacting a carbocyclic aromatic compound free from polar groups capable of reacting with phosphoric anhydride with hexagonal phosphoric anhydride at a temperature between 250° and 325° C.

2. The process of claim 1 in which phosphorus oxychloride is used as a diluent.

3. A process of claim 1 in which Ar is beta-naphthyl.
4. A process according to claim 3 in which phosphorus oxychloride is used as a diluent.
5. A process of claim 1 in which Ar is chlorophenyl.
6. A process according to claim 5 in which phosphorus oxychloride is used as a diluent.
7. A process of claim 1 in which Ar is o-xylyl.
8. A process according to claim 7 in which phosphorus oxychloride is used as a diluent.
9. A process according to claim 1 in which the phosphorus pentachloride is used in excess and the excess is destroyed by means of sulfur dioxide.
10. A process for preparing phosphonic dichlorides of the formula ArPOCl₂ in which Ar stands for a carbocyclic aromatic radical free from polar groups capable of reacting with phosphoric anhydride which comprises heating a compound of the formula

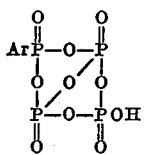

in which Ar has the same meaning as above with phosphorus pentachloride.
11. The process of claim 10 in which phosphorus oxychloride is used as a diluent.
12. A process according to claim 11 in which an excess of phosphorus pentachloride is used and the excess is destroyed by means of sulfur dioxide.
13. A process of claim 10 in which Ar is phenyl.
14. A process according to claim 13 in which phosphorus oxychloride is used as a diluent.

15. A process for preparing aromatic phosphonic dichlorides of the formula ArPOCl₂ where Ar is a carbocyclic aromatic radical of the benzene and naphthalene series which consists in heating with phosphorus pentachloride reaction products produced by reacting a carbocyclic aromatic compound free from polar groups capable of reacting with phosphoric anhydride with hexagonal phosphoric anhydride at a temperature between 250° and 325° C.
16. A process for preparing phosphonic dichlorides of the formula ArPOCl₂ in which Ar stands for a carbocyclic aromatic radical of the benzene and naphthalene series free from polar groups capable of reacting with phosphoric anhydride which comprises heating a compound of the formula

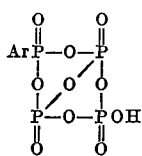

in which Ar has the same meaning as above with phosphorus pentachloride.

References Cited in the file of this patent
UNITED STATES PATENTS

| | | |
|---|---|---|
| 2,382,309 | Hamilton et al. | Aug. 14, 1945 |
| 2,717,906 | Lecher | Sept. 13, 1955 |

OTHER REFERENCES

Synthetic Insecticides, B. I. O. S. Final Report, December 1947, page 5.